(12) United States Patent
Chien (10) Patent No.: US 9,847,017 B2
(45) Date of Patent: Dec. 19, 2017

(54) REMOTE CONTROL APPARATUS COMMANDED WIRELESSLY BY A USER DEVICE FOR CONTROLLING A TARGET DEVICE

(71) Applicant: Steven Yuh-Ming Chien, Rancho Palos Verdes, CA (US)

(72) Inventor: Steven Yuh-Ming Chien, Rancho Palos Verdes, CA (US)

(*) Notice: Subject to any disclaimer, the term of this patent is extended or adjusted under 35 U.S.C. 154(b) by 7 days.

(21) Appl. No.: 14/717,101

(22) Filed: May 20, 2015

(65) Prior Publication Data

US 2016/0343245 A1 Nov. 24, 2016

(51) Int. Cl.
*G08C 17/02* (2006.01)
*G05B 11/01* (2006.01)
*H04N 21/422* (2011.01)

(52) U.S. Cl.
CPC ....... *G08C 17/02* (2013.01); *H04N 21/42225* (2013.01); *H04N 21/42226* (2013.01); *G08C 2201/30* (2013.01); *G08C 2201/40* (2013.01); *G08C 2201/93* (2013.01)

(58) Field of Classification Search
CPC .... G08C 17/02; G08C 19/28; G08C 2201/92; G08C 23/04; G08C 2201/20; G08C 2201/21; G08C 2201/61; G08C 2201/93; G08C 2201/94; G08C 2201/40; G08C 2201/91; G08C 2201/50; H04M 1/72525; H04M 1/72533; H04M 2250/02; H04M 2250/22; H04M 11/007; H04M 11/025; B23K 9/1062; B23K 9/1087; G06F 21/567; G06F 3/00; G06F 3/0231; H04N 21/43615; H04N 21/42207; H04N 21/42208; H04N 21/4221; H04N 21/42221; H04N 21/42226; H04N 21/42684; H04N 21/654; H04N 21/6581; H04N 21/8186; H04N 5/44; H04N 21/42225; H04R 2227/005; H04R 27/00; H04B 10/1149; H04B 10/40; H04B 10/114; H04B 10/1141; H04B 1/40; H04W 84/10; H04W 84/18; H04W 8/24; H03M 1/002; H03M 1/12; H03M 1/188; H03M 1/36; H03M 1/66; H03M 1/70; H03M 1/74
See application file for complete search history.

(56) References Cited

U.S. PATENT DOCUMENTS

| 7,778,604 | B2 | 8/2010 | Bauman | |
|---|---|---|---|---|
| 2004/0166840 | A1* | 8/2004 | Kawamura | G08C 19/28 455/419 |
| 2008/0137572 | A1* | 6/2008 | Park | G08C 17/02 370/310 |
| 2010/0280677 | A1* | 11/2010 | Budike, Jr. | H05B 37/0272 700/296 |

(Continued)

*Primary Examiner* — Dionne H Pendleton
(74) *Attorney, Agent, or Firm* — The Law Office of Tong Lee (57) ABSTRACT

A remote control apparatus receives, processes and then transmits wireless signals as control commands specific to a target appliance, device or product. The apparatus, which is a combination of a remote receiving device and a secondary relay transmitting device, communicates with the target device to control its operations. The apparatus can be used to control a plurality of target devices via their existing remote controlling scheme. The apparatus can operate in an area that does not have existing wireless infrastructure, and can be controlled by a user device.

20 Claims, 6 Drawing Sheets

(56) References Cited

U.S. PATENT DOCUMENTS

| | | | | |
|---|---|---|---|---|
| 2013/0129358 A1* | 5/2013 | Jung | ............... | H04B 10/1141 |
| | | | | 398/112 |
| 2013/0222121 A1* | 8/2013 | Shen | ............... | G08C 17/02 |
| | | | | 340/12.22 |
| 2014/0111318 A1* | 4/2014 | Arling | ............... | G08C 17/02 |
| | | | | 340/12.22 |
| 2014/0267934 A1* | 9/2014 | Hardin | ............... | H04N 21/654 |
| | | | | 348/734 |
| 2014/0300501 A1* | 10/2014 | Ling | ............... | H03M 1/12 |
| | | | | 341/144 |
| 2016/0240007 A1* | 8/2016 | Weerasinghe | ............... | G06T 19/006 |
| 2016/0371970 A1* | 12/2016 | Huang | ............... | G08C 17/02 |

\* cited by examiner

FIG. 10 though is a diagram illustrating a user interface provided

REMOTE CONTROL APPARATUS COMMANDED WIRELESSLY BY A USER DEVICE FOR CONTROLLING A TARGET DEVICE

TECHNICAL FIELD

Embodiments of the invention relate to a remote control device that can be controlled wirelessly.

BACKGROUND

Modern home appliances typically have wired or wireless signal interfaces to receive control signals for their operations. A wired controller, which sends wired control signals to an appliance, is typically installed onto or near the target appliance via electrical connections to provide the control functionality. Such installation often requires disassembly of target appliance, tools, and a general knowledge of working with electrical equipment. Furthermore, installers often need to negotiate tight spaces and make use of equipment and ladders to perform the installation. This limits the use of such controllers to only those people who are physically able to perform the installation procedure and possess the knowledge and competence to carry it out.

Ever since the advent of television remote controls that eliminated the need for a user to physically get up and change the channel, the ability to wirelessly control devices and appliances is rapidly becoming a requisite for purchase as more and more products with this capability flood the market. Everything from home entertainment systems to thermostats and lighting can be adjusted by remote control in the present market. However, it is often the case that each of these appliances requires their own specific remote control. Universal remote controls attempt to remedy this mess by adding the ability to control multiple devices. Having a universal remote control may help a single user, but when multiple users need to control an appliance or device, each of these users would then still need his/her own controller to avoid the inconvenience of sharing the same controller.

As such, there is a need for a controller device that can provide multiple users the control functionality through a wireless interface that does not require long or arduous installation.

SUMMARY

According to one embodiment, a small standalone device (also referred to as an apparatus) is provided to receive, process and then transmit wireless signals as control commands specific to a target appliance, device or product. The apparatus, which is a combination of a remote receiving device and a secondary relay transmitting device, communicates with the target appliance to control the operations of the target appliance. The apparatus can be used to control a plurality of target appliances via their existing remote controlling scheme.

The apparatus can operate in an area that does not have existing wireless infrastructure, and therefore it can operate without a variety of potential proximity limitations. The apparatus can be interacted with through already-owned user devices, including portable, handheld, wearable, and other remote transmitting devices with software based control.

According to one embodiment, a remote control apparatus is provided. The remote control apparatus comprises a wireless receiver circuitry to receive an incoming signal over a wireless personal area network from a user device, convert the incoming signal to an electrical signal carrying a wired command, and send the wired command through a wire connection to a wireless transmitter circuitry. The remote control apparatus further comprises the wireless transmitter circuitry coupled to the wireless receiver circuitry. The wireless transmitter circuitry further comprises an interface to send the wired command as a control input to the target device remote controller to thereby activate a virtual button; and a target device remote controller to transmit, in response to activation of the virtual button, an outgoing signal to wirelessly control an operation of a target device.

According to another embodiment, a remote control apparatus is provided. The remote control apparatus comprises a wireless receiver circuitry to receive wireless signals from a user device over a wireless personal area network, the wireless signals causing the wireless receiver circuitry to pair with the user device and be configured by the user device. The wireless receiver circuitry is further adapted to convert a wireless user command from the user device to an electrical signal carrying a binary command. The remote control apparatus further comprises a wireless transmitter circuitry coupled to the wireless receiver circuitry. The wireless transmitter circuitry further comprises an interface to decode the binary command into a control input to activate one or more pins of a target device remote controller to thereby activate a virtual button; and the target device remote controller to transmit, in response to activation of the virtual button, an outgoing signal to wirelessly control an operation of a target device.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide an apparatus and method that enables a user to wirelessly activate and control a wireless controller. That is, the apparatus described herein may be used as a remotely controlled remote controller. The apparatus may operate in an environment (e.g., a home) that does not have existing wireless infrastructure, and therefore, can do away with a variety of potential proximity limitations; e.g., the apparatus can, but does not need to, be within the coverage area of a wireless router. The apparatus is capable of establishing a wireless connection (e.g., a wireless personal area network) in its own independent wireless network that is compatible with the existing software-controlled user device. The wireless protocol used in one embodiment is Bluetooth, but similar spectrums, protocols and interfaces may also be used, such as Wi-Fi Direct, Near Field Communication (NFC) and any other applicable standards.

The apparatus provides a means for multiple users to control the same target device (e.g., a home appliance) wirelessly, with each user controlling the target device, via the apparatus, using their personal portable, handheld, wearable devices, including but not limited to: smart phones, smart watches, tablets, phablets, laptops, and other portable, handheld, wearable devices that have wireless transmitting capabilities and software based control. The user device may run a software application that allows the user to activate or deactivate the target device, or to select a desired operation of the target device, from a user interface, e.g., a graphical user interface on a touch screen or a voice-activated interface via a microphone. The user device may also implement enhanced security measures, including but not limited to, password key protection, swipe pattern, and fingerprint scanning.

The apparatus can be easily installed without the need for tools or electrical knowledge. The physical design of the apparatus is intended to be discrete and provide seamless operation. Power is supplied by home power mains, though the apparatus draws very little power and can operate in the form of a "wall-wart" with a pass-through electrical socket for minimal encumbrance.

The technology outlined in the following description can be applied to myriad target devices such as household appliances, including television sets, automated blinds, door openers, air conditioning units, heaters, fans, lights, and more. In one embodiment, the apparatus described herein sends commands to operate a garage door opener. In another embodiment, this apparatus sends commands to operate a television set. In alternative embodiments, this apparatus sends commands to control multiple appliances in a target area.

Figure 1:
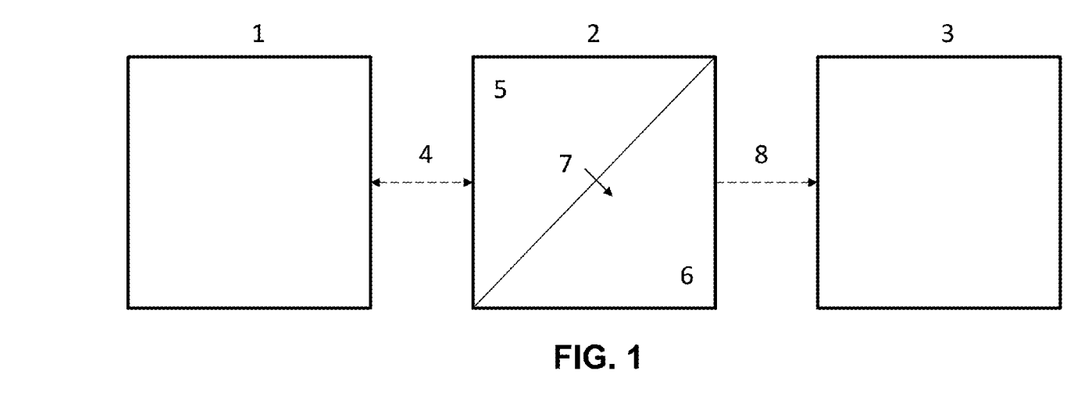
FIG. 1 illustrates a remote control apparatus receiving a command from a user device to control a target device according to one embodiment.

FIG. 1 illustrates a remote control apparatus 2 commanded by a user device 1 to control a target device 3 according to one embodiment. In FIG. 1, a user inputs a user command into the user device 1 for an operation to be performed by the target device 3. The user command is carried by a wireless signal 4, and is received and processed by the remote control apparatus 2. In one embodiment, the wireless signal 4 may be sent from the user device 1 over a wireless personal area network; e.g., via a Bluetooth connection, to the remote control apparatus 2. In an alternative embodiment, a different wireless connection such as a Wi-Fi Direct or NFC connection may also be used.

In one embodiment, the remote control apparatus 2 includes a receiver section 5 and a transmitter section 6. The receiver section 5 receives and interprets the information in the wireless signal 4 and sends a wired command 7 to the transmitter section 6. The transmitter section 6 translates the wired command 7 based on application (e.g., the specific type of the target device 3) and wirelessly sends a wireless signal 8 to the target device 3 to command the target device 3 to perform the user requested operation.

Figure 2:
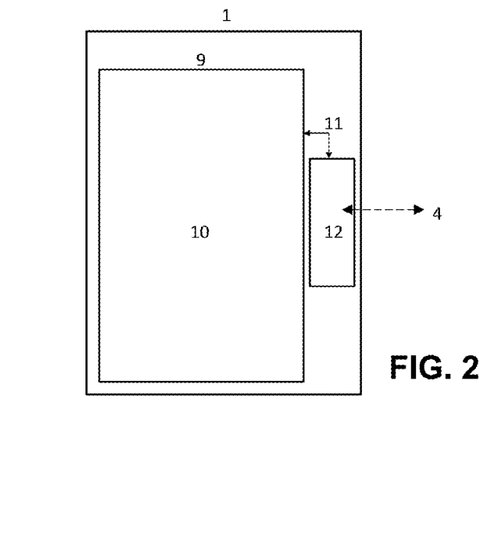
FIG. 2 is a diagram illustrating the user device according to one embodiment.

FIG. 2 illustrates further details of the user device 1 according to one embodiment. Examples of the user device 1 may include portable, handheld, wearable devices, including but not limited to: smart phones, smart watches, tablets, phablets, laptops, and other portable, handheld, wearable devices that have wireless transmitting capabilities and software based control. In this embodiment, the user device 1 includes a display 9 that presents a user interface 10 for the user to input a user command 11. The user device 1 also includes an embedded processor 12, which receives the user command 11 and sends the wireless signal 4 to the remote control apparatus 2 of FIG. 1. The user may input the user command 11 on the user device 1 through a software interface programmed to receive the user's input. Alternatively, the user may input the command using a physical interface, such as a click button.

Figure 3:
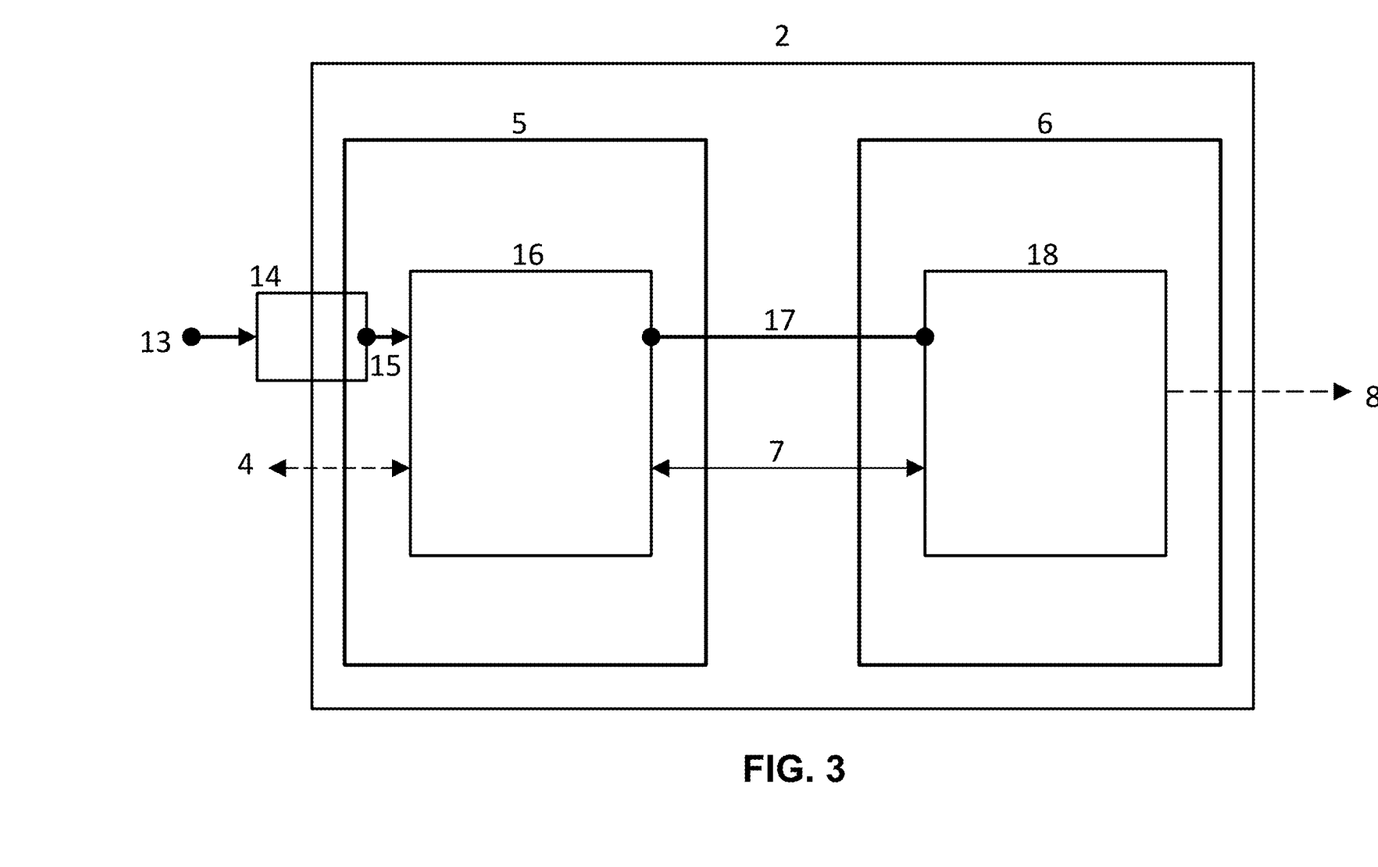
FIG. 3 is a diagram illustrating the remote control apparatus according to one embodiment.

FIG. 3 illustrates further details of the remote control apparatus 2 according to one embodiment. As described in connection with FIG. 1, the remote control apparatus 2 includes a receiver section 5 and a transmitter section 6. The receiver section 5 further includes a wireless receiver circuitry 16 (e.g., a Bluetooth chip), which receives the incoming wireless signal 4 (e.g., over Bluetooth), interprets and processes the wireless signal 4 to send the wired command 7 to the transmitter section 6. The transmitter section 6 includes a wireless transmitter circuitry 18, which receives, interprets and processes the wired command 7, and transmits the outgoing wireless signal 8 to the target device 3. Additional electrical components not shown in FIG. 3 may be used to interface the receiver section 5 and the transmitter section 6. In one embodiment, power for the remote control apparatus 2 may be provided from a mains power line 13 that supplies alternating current (AC) power. A transformer 14 converts the AC power to direct current (DC) power, and the DC power is routed to further modules within the remote control apparatus 2 via electrical connections such as circuitry and lines 15 and 17.

Figure 4:
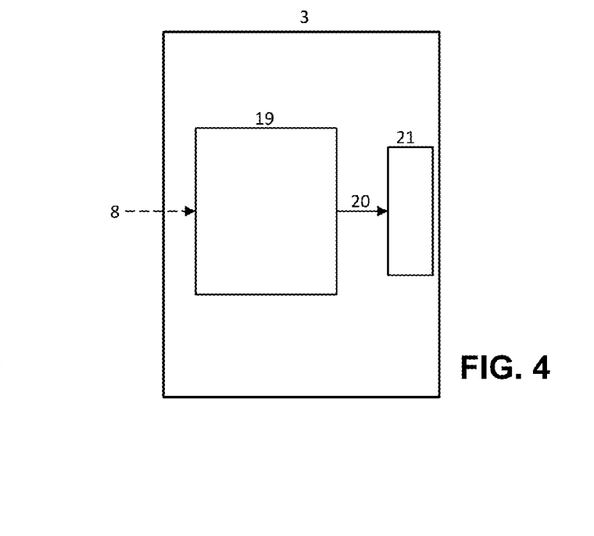
FIG. 4 is a diagram illustrating the target device according to one embodiment.

FIG. 4 illustrates further details of the target device 3 according to one embodiment. In some embodiments, the target device 3 may be a garage door opener, a home appliance, or any device or appliance that can be controlled wirelessly. In one embodiment, the target device 3 includes a wireless signal receiver 19, which receives the wireless signal 8, converts it to a wired signal 20, and sends the converted signal to a switch 21 which executes operation of the target device 3; e.g., opening, closing, or stopping a garage door.

Figure 5:
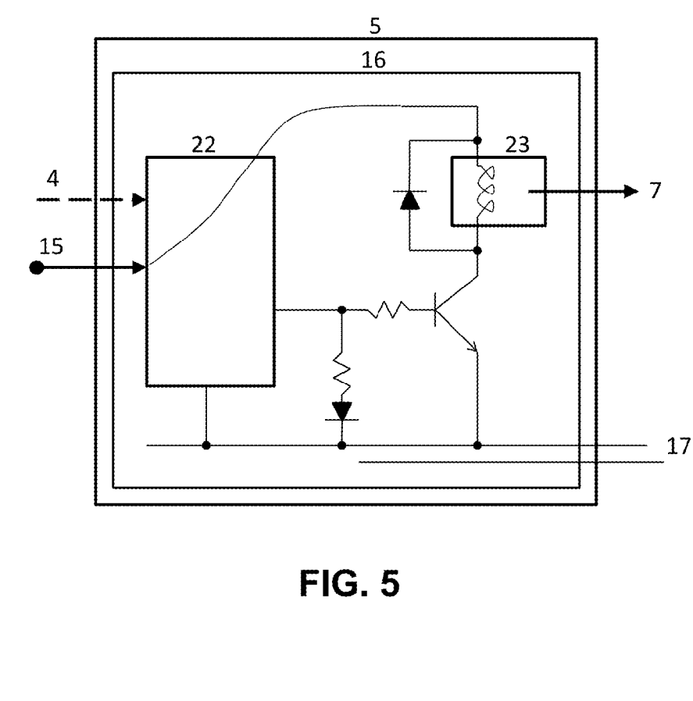
FIG. 5 is a diagram illustrating a wireless receiver circuitry in the remote control apparatus according to one embodiment.

FIG. 5 is a diagram illustrating the receiver section 5 in the remote control apparatus 2 according to one embodiment. The receiver section 5 includes the wireless receiver circuitry 16. Within the wireless receiver circuitry 16, a wireless receiving and transmission chip 22 receives the wireless signal 4, interprets the user command 11 in the wireless signal, and converts the user command 11 to an electrical signal specifying a user-requested operation to be performed by the target device 3. The wireless receiving and transmission chip 22 transmits the electrical signal through a circuitry that includes an electrical relay 23. The relayed electrical signal is then sent to the transmitter section 6, e.g., as the wired command 7, through a wire connection.

FIG. 5 also shows the electrical lines 15 and 17 that supply power to the circuitry in the wireless receiver circuitry 16. When the wireless receiver circuitry 16 receives an "activate" command from the wireless signal 4, the wireless receiver circuitry 16 turns on a controller output line which enables the electrical relay 23, in terms of enabling the current to pass through from line 15 to line 17.

Figure 6:
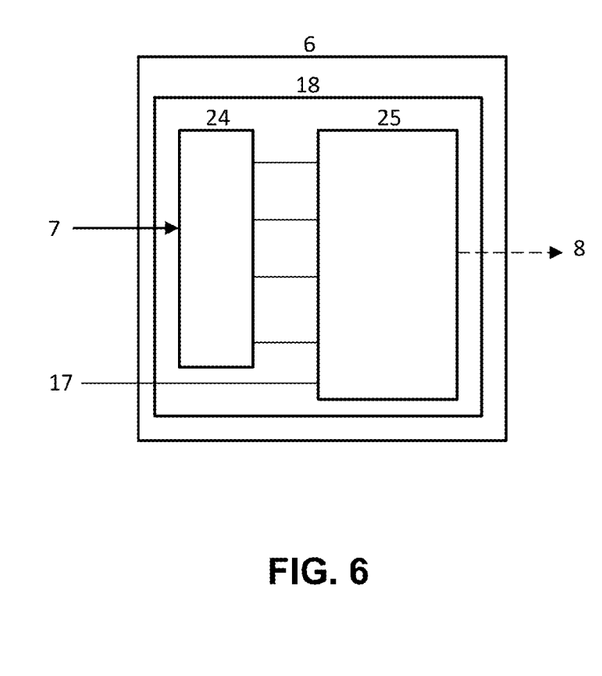
FIG. 6 is a diagram illustrating a wireless transmitter circuitry in the remote control apparatus according to one embodiment.

FIG. 6 is a diagram illustrating the transmitter section 6 in the remote control apparatus 2 according to one embodiment. The transmitter section 6 includes a wireless transmitter circuitry 18, which further includes an interface 24 and a target device remote controller 25. The interface 24 receives the wired command 7 from the receiver section 5, converts the wired command 7 to a control input, and sends the control input to the target device remote controller 25. The target device remote controller 25 may include one or more pins wired to the interface 24 to receive the control input. In one embodiment, the target device remote controller 25 includes an application-specific remote control that sends a command over a wireless signal 8 to control the operations of the target device 3 as commanded by the user. In another embodiment, the target device remote controller 25 includes multiple application-specific remote controls that wirelessly control the operations of multiple different target devices located in a target area. The application-specific remote control may be an off-the-shelf component. An example of an application-specific remote control is a garage door remote control unit (i.e., a portable transmitter unit) that can be carried by a user to communicate with a garage door opener typically installed on the ceiling of a garage. Another example of an application-specific remote control is a TV remote control unit that is carried by a user to communicate with a TV set. These off-the-shelf components can be easily found on the market and assembled into the remote control apparatus 2.

Further details of the remote control apparatus 2 are provided below according to one embodiment. In one embodiment, the receiver circuitry 16 has several electrical pins (also referred to as logic pins or pins) that can be remotely commanded from the user device 1 to assume either a high or low CMOS logic level. These weak logic signals are amplified by a transistor to drive an electromagnetic reed relay (e.g., the electrical relay 23 in FIG. 5) which, after passing the interface 24, closes switches on the target device remote controller 25 in FIG. 6. The remote control apparatus 2 utilizes the available logic pins of the receiver circuitry 16, in combination with the corresponding independent sets of transistor and relay circuitry, to provide multiple control options (in the case of a garage door opener, the control options may include open/close a garage door, open/close a second garage door in the same garage, etc.). In one embodiment, the remote command can activate one available logic pin at a time, such that each pin along with the internal circuitry provide the equivalent of one control button (also referred to as a virtual button, which has a one-to-one correspondence to a physical button on a conventional remote control unit, e.g., the physical button(s) on a conventional TV remote control or a garage door remote control). In another embodiment, the remote command can activate a combination of logic pins, such that more virtual buttons can be provided than the number of available pins. Instead of pressing the virtual buttons by physical contact to operate the target device 3, these virtual buttons can be pressed remotely according to the remote user command.

To control the logic pins of the receiver circuitry 16, the receiver circuitry 16 is first placed into a command mode by the user device 1 sending an "enter configuration mode" code. Next, the receiver circuitry's 16 general purpose input/output (GPIO) pins are configured as outputs by additional "Configure Pin X (GPIO X) for digital output" codes sent from the user device 1. The receiver circuitry's 16 other available logic pins can also be configured for additional control functions. After the receiver circuitry 16 is configured, it is ready to receive commands for operating the target device 3.

In one embodiment, the following codes can be sent by the user device 1 to simulate the pressing of a single button on the target device remote controller 25 to provide three control options. An example of controlling a garage door opener is provided below. It is understood that the configuration and commands described herein can be applied to remotely control any types of target devices.

"Set Pin X (GPIO X) logic high"—This command opens the garage door, which has the same effect as pressing an "open" button on a conventional garage door remote control.

"Set Timer for N seconds"—This command has the same effect as holding the "open" button on a conventional garage door remote control down for N seconds.

"Set Pin X (GPIO X) Logic low"—This command closes the garage door, which has the same effect as releasing the "open" button on a conventional garage door remote control.

By configuring multiple pins of the receiver circuitry 16 with the above-mentioned logic coding, the commands from the user device 1 can simulate pressing or activating multiple garage door remote control buttons. With the combination of the logic coding, the user commands can also simulate different height of garage door opening for predetermined settings or for user customizations.

The target device remote controller 25 in the above example may be an off-the-shelf garage door remote control circuit (i.e., the circuit within a portable transmitter that a user carries to open a garage door) that includes a pin corresponding to the "open" button. The interface 24 in this example may include wires and/or relays to pass the GPIO X output (i.e., the wired command 7) to the "open button" pin. In another embodiment that provides multiple virtual buttons, the wired command 7 may be a binary command that is decoded by the interface 24, and the decoded output is sent to multiple pins of the target device remote controller 25. For example, a 3-digit binary command can be decoded by the interface 24 into eight combinations to activate eight different input pins of the target device remote controller 25. Each path from a pin of the receiver circuitry 16 that receives the user command 4 to a pin of the target device remote controller 25 that receives the wired command 7 (decoded if the wired command 7 is a binary command) is herein referred to as a virtual button. A virtual button has a one-to-one correspondence to a physical button on an off-the-shelf remote control unit that can be found on the market.

Figure 7:
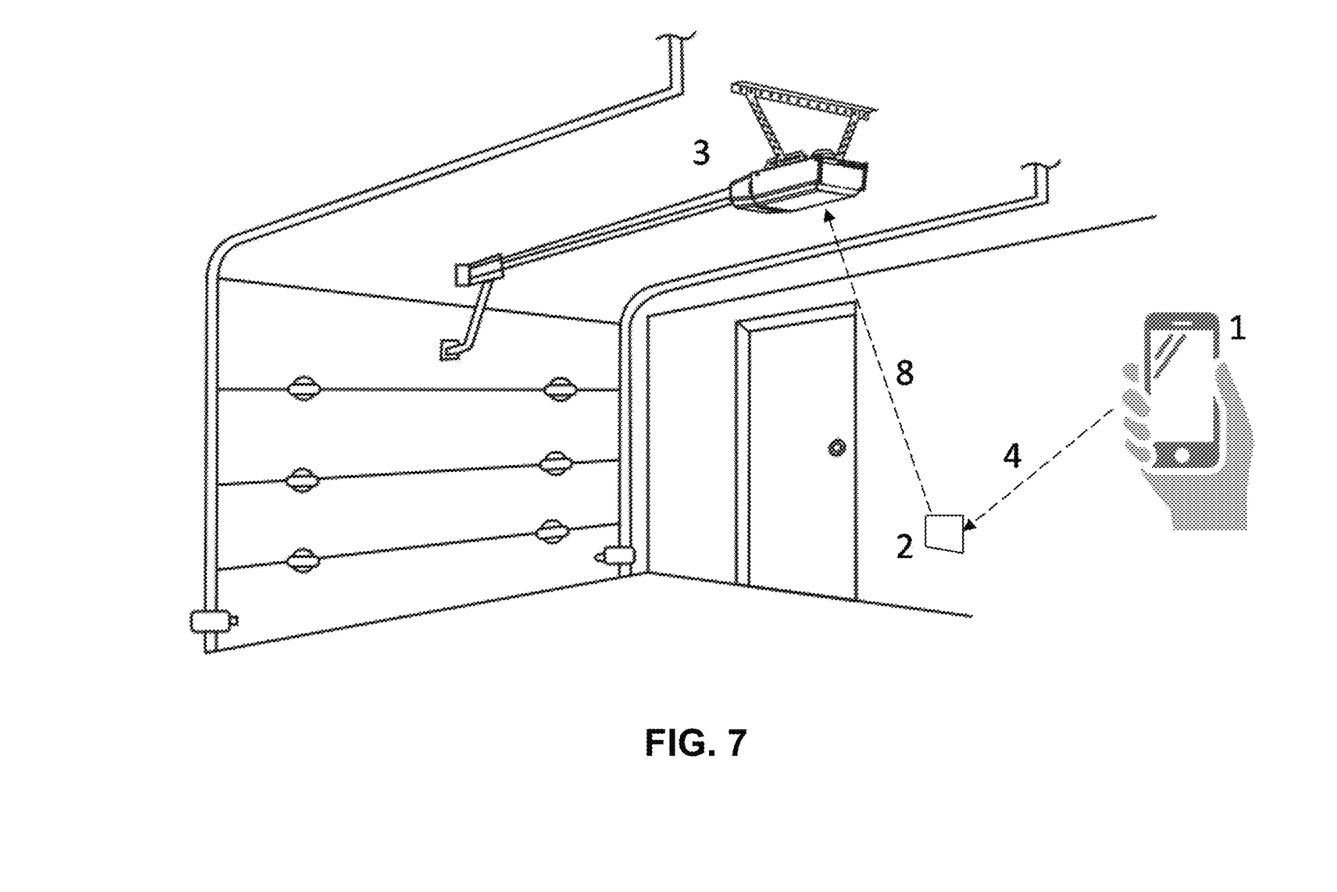
FIG. 7 illustrates an example of an environment in which the remote control apparatus may be installed.

FIG. 7 illustrates an example of an environment in which the remote control apparatus 2 may be installed to interact with the target device 3. In one embodiment, the remote control apparatus 2 can be plugged into an electrical outlet on the wall. In this example, the target device 3 is a switch for operating a garage door. It is understood the embodiments described herein may be applicable to any appliance or device that can be remotely controlled by wireless means. A user may interact with the smart device 1 to command the target device 3 to perform an operation (e.g., opening a garage door). The smart device 1 then sends a wireless signal 4 to the remote control apparatus 2, which converts the signal 4 and sends the second wireless signal 8 to the target appliance 3 to execute the user-requested operation.

Figure 8:
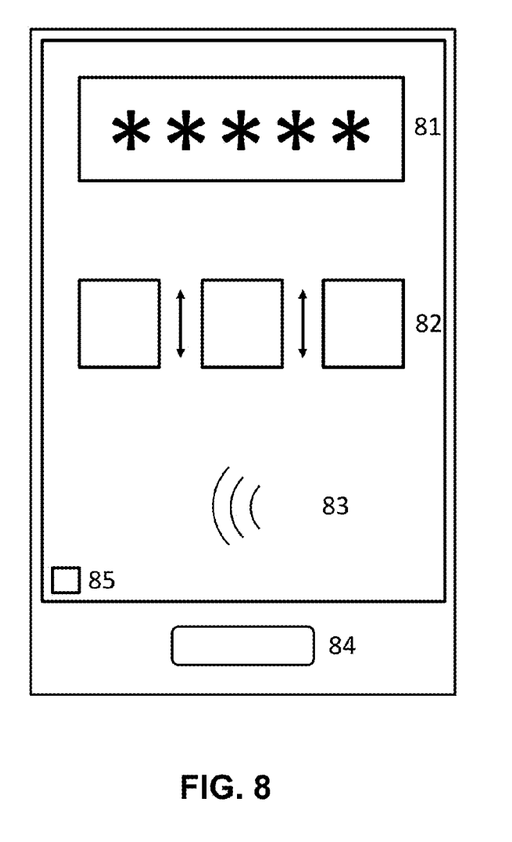
FIG. 8 is a diagram illustrating a user interface provided by the user device for security according to one embodiment.

FIG. 8 is a diagram illustrating a user interface of the user device 1 to provide security measures for accessing the remote control apparatus 2 according to one embodiment. It is noted that the user device 1 may provide one or more of the security measures as shown in FIG. 8. The security measures may include, but not be limited to: standard password protection 81, roller-style combination lock protection 82, voice recognition protection 83, biometric protection (for compatible devices) 84, and protection settings 85. In one embodiment, the protection settings 85 is a soft button that can be selected or set by the user to turn on or off the security measure(s).

Figure 9:
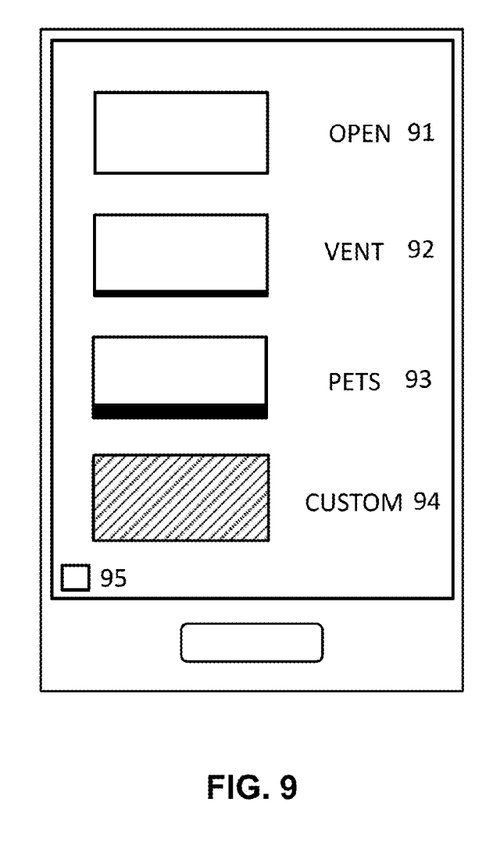
FIG. 9 is a diagram illustrating a user interface provided by the user device for a user to select a target device function according to one embodiment.

FIG. 9 is a diagram illustrating a user interface of the user device 1 to provide multiple options for controlling the target device 3 according to one embodiment. In the example of a garage door opener, the options may include, but not be limited to: full open/close 91, slight open for venting purposes 92, partial opening for pet access 93, custom-defined opening amount 94, and opening settings 95. In one embodiment, the opening settings 95 is a soft button that can be selected or set by the user to activate or deactivate the options. It is understood that different options may be offered for different types of target devices.

In one embodiment, the security measures of FIG. 8, the options of FIG. 9 and commands for controlling the target device 3 (via the remote control apparatus 2) may be provided to the user device 1 by a software application containing code (composed of software instructions) and data stored and executed by a processing module (e.g., the embedded processor 12 in FIG. 2) in the user device 1. The processing module may store the code and data using computer-readable media (also referred to as a machine-readable medium, a processor-readable medium, or a computer usable medium having a computer readable program code embodied therein), such as non-transitory tangible computer-readable media (e.g., magnetic, optical, or electrical storage medium including a diskette, compact disk read only memory (CD-ROM), digital versatile disc read only memory (DVD-ROM) memory device, or similar volatile or non-volatile storage mechanism). The processing module may also receive and transmit (internally and/or with other electronic devices over a network) the code and data via transitory computer-readable transmission media (e.g., electrical, optical, acoustical or other form of propagated signals—such as carrier waves, infrared signals).

Figure 10:
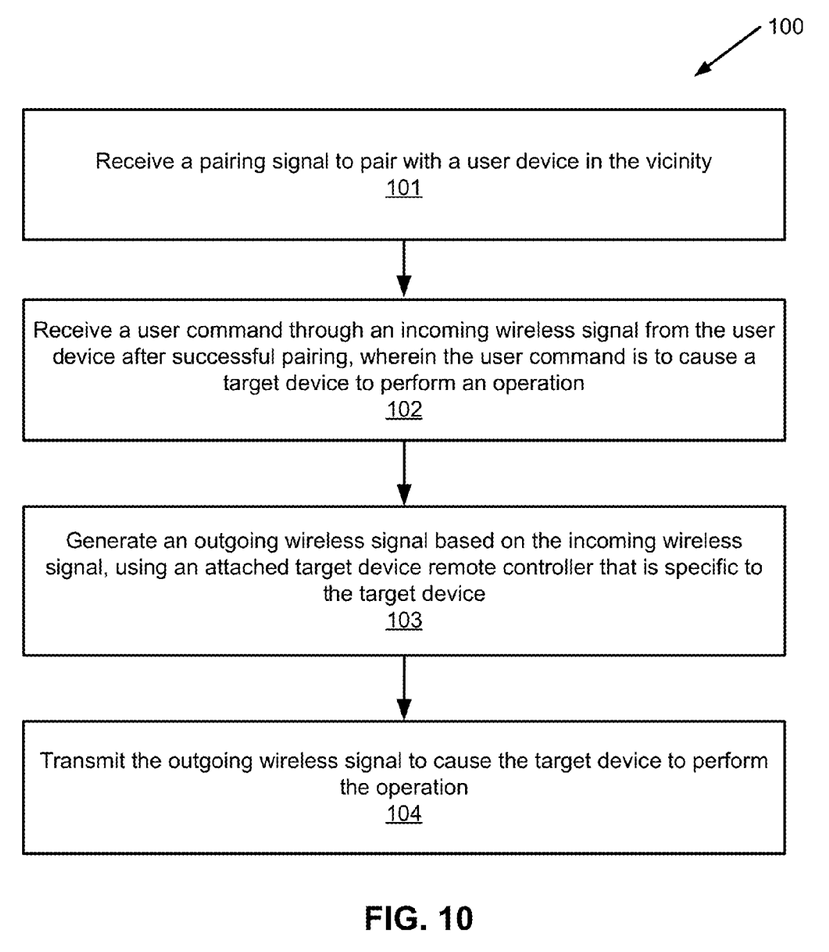
FIG. 10 is a flow diagram illustrating a method performed by the remote control apparatus according to one embodiment.

FIG. 10 is a flow diagram illustrating a method 100 performed by the remote control apparatus 2 according to one embodiment. The method 100 begins with the remote control apparatus 2 receiving a pairing signal to pair with the user device 1 (or other wireless devices) in the vicinity (block 101). After successful pairing, the remote control apparatus 2 receives a user command through an incoming wireless signal from the user device 1 (block 102), where the user command is to cause the target device 3 to perform an operation. The remote control apparatus 2 then generates an outgoing wireless signal based on the incoming wireless signal (block 103), using the enclosed or attached target device remote controller 25 that is specific to the target device 3. The remote control apparatus 2 transmits the outgoing wireless signal to cause the target device to perform the operation (block 104).

The universality of the invention described herein warrants its necessity. The primary means to control household appliances can be harnessed by existing computers, hand-held, or wearable devices through the implementation of this invention. As most members of the household are likely to already own a device capable of wireless transmission and software control, it is not necessary for the end user to purchase a control module for each member of the end user group. Furthermore, the nature of the invention allows it to be multi-purpose and multi-functional, consolidating existing remote controls, in one embodiment, for things like home entertainment systems to a single, discrete device.

In the embodiment of a wireless garage door opener, the invention provides a means to easily operate the garage door in a flexible manner. This invention removes the need for a garage door remote in every vehicle, and allows pedestrian traffic in and out of the garage without the need for a dedicated opener. This is beneficial for recreational activities outside the home, or for children returning from school or other engagements. Multiple devices can be connected simultaneously for multi-user functionality. The technology in the invention allows for multiple modes of operation. For the garage door embodiment, a command can be sent to open the door just slightly for ventilation purposes rather than entry.

For the embodiment of a television controlling device, the invention provides a way for an existing handheld device like a smart phone or tablet to control a television without the need for a compatible television. Inputs from the handheld device are sent to the invention, which then translates them and sends commands that the television receives and executes. This specific embodiment would include any functionality required for things like changing channels, volume, accessing menu items, etc. This can be expanded to provide a universal home entertainment system functionality, wherein the invention is capable of replacing multiple remote transmitters for each of the components in the system.

In another embodiment, the invention can be used to wirelessly turn on an air conditioning unit that would otherwise require a dedicated remote control. The procedure would work in much the same way as other embodiments, with an input from a handheld device being received an translated by the invention, then sent out to the air conditioner as a command to turn on, off, or adjust temperature.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A remote control apparatus dedicated for controlling a target device via a direct and one-way wireless communication with the target device, comprising:
a wireless receiver circuitry to receive an incoming signal over a wireless personal area network from a user device to command the target device to perform a pre-determined operation, the wireless receiver circuitry operative to convert the incoming signal to an electrical signal carrying a wired command, and send the wired command through a wire connection to a wireless transmitter circuitry; and
the wireless transmitter circuitry coupled to the wireless receiver circuitry, the wireless transmitter circuitry further comprising:
an interface to receive the wired command, and send the wired command as a control input to a target device remote controller; and
the target device remote controller in the direct and one-way wireless communication with the target device, the target device remote controller located in a same housing as the wireless receiver circuitry and the wireless transmitter circuitry and including internal circuitry connected to the interface via a plurality of pins,
wherein a predetermined subset of the pins, when activated by the control input, wirelessly control the predetermined operation of the target device,
wherein different subsets of the pins, when activated, wirelessly control different operations of the target device, and
wherein activation of each subset of the pins is controlled by a corresponding displayed option provided by the user device.

2. The remote control apparatus of claim 1, wherein the wireless personal area network is a Bluetooth personal area network.

3. The remote control apparatus of claim 1, wherein the wireless receiver circuitry is adapted to perform a pairing process with the user device before receiving the incoming signal from the user device.

4. The remote control apparatus of claim 1, wherein the user device is a portable device adapted to execute application software to generate the incoming signal, and to provide a user interface for a user to command the operation of the target device.

5. The remote control apparatus of claim 4, wherein the portable device displays a graphical user interface presenting a plurality of options for a user to command a plurality of operations of the target device.

6. The remote control apparatus of claim 4, wherein the portable device is a smartphone.

7. The remote control apparatus of claim 4, wherein the portable device is a wearable device.

8. The remote control apparatus of claim 1, wherein the wireless receiver circuitry includes one or more pins remotely configurable by the user device.

9. The remote control apparatus of claim 1, wherein the target device remote controller includes one or more application-specific remote controls that wirelessly control operations of one or more target devices.

10. The remote control apparatus of claim 1, wherein the target device remote controller is adapted to generate a plurality of wireless signals, each of which carrying a different command for a different operation of the target device.

11. The remote control apparatus of claim 1, wherein control of the target device from the user device is protected by one or more security measures provided by the user device.

12. The remote control apparatus of claim 1, wherein the target device is a garage door opener and the target device remote controller is a garage door remote control unit.

13. The remote control apparatus of claim 1, wherein the target device is a home appliance and the target device remote controller is a home appliance remote control unit.

14. The remote control apparatus of claim 1, wherein the wireless transmitter circuitry further comprises a plurality of target device remote controllers to wirelessly control operations operation of a plurality of target devices.

15. A remote control apparatus dedicated for controlling a target device via a direct and one-way wireless communication with the target device, comprising:
a wireless receiver circuitry to receive wireless signals from a user device over a wireless personal area network, the wireless signals to command the target device to perform a pre-determined operation and to cause the wireless receiver circuitry to pair with the user device and be configured by the user device, wherein the wireless receiver circuitry is further adapted to convert the wireless signals from the user device to an electrical signal carrying a binary command; and
a wireless transmitter circuitry coupled to the wireless receiver circuitry, the wireless transmitter circuitry further comprising:
an interface to decode the binary command into a control input; and
a target device remote controller in the direct and one-way wireless communication with the target device, the target device remote controller located in a same housing as the wireless receiver circuitry and the wireless transmitter circuitry and including circuitry connected to the interface via a plurality of pins,
wherein a predetermined subset of the pins, when activated by the control input, wirelessly control the predetermined operation of the target device,
wherein different subsets of the pins, when activated, wirelessly control different operations of the target device, and
wherein activation of each subset of the pins is controlled by a corresponding displayed option provided by the user device.

16. The apparatus of claim 15, wherein the user device is adapted to execute application software to generate the incoming signal, and is at least one of the following: a portable device, a handheld device, and a wearable device.

17. The apparatus of claim 15, wherein the target device is a garage door opener and the target device remote controller is a garage door remote control unit.

18. The apparatus of claim 15, wherein the target device is a home appliance and the target device remote controller is a home appliance remote control unit.

19. A remote control apparatus dedicated for controlling a garage door opener via a direct and one-way wireless communication with the garage door opener, comprising:
a wireless receiver circuitry to receive an incoming signal over a wireless personal area network from a user device to command the garage door opener to perform a pre-determined operation, the wireless receiver circuitry operative to convert the incoming signal to an electrical signal carrying a binary command; and the wireless transmitter circuitry coupled to the wireless receiver circuitry, the wireless transmitter circuitry further comprising:

an interface to decode the binary command into a control input; and a garage door remote control unit in the direct and one-way wireless communication with the garage door opener, the garage door remote control unit located in a same housing as the wireless receiver circuitry and the wireless transmitter circuitry and including internal circuitry connected to the interface via a plurality of pins, wherein activation of different subsets of the pins is controlled by a corresponding displayed option provided by the user device.

20. The apparatus of claim 19, wherein the user device displays a graphical user interface presenting a plurality of options for a user to command a plurality of operations of the garage door opener.

* * * * *